United States Patent [19]

Constien et al.

[11] Patent Number: 4,828,034

[45] Date of Patent: May 9, 1989

[54] METHOD OF HYDRATING OIL BASED FRACTURING CONCENTRATE AND CONTINUOUS FRACTURING PROCESS USING SAME

[75] Inventors: Vernon G. Constien, Sperry; Harold D. Brannon, Glenpool, both of Okla.

[73] Assignee: Dowell Schlumberger Incorporated, Tulsa, Okla.

[21] Appl. No.: 85,999

[22] Filed: Aug. 14, 1987

[51] Int. Cl.$^4$ .............................................. E21B 43/26
[52] U.S. Cl. ..................... 166/308; 252/8.551; 366/348
[58] Field of Search ................ 166/308, 305.1, 75.1; 366/348; 252/8.551, 8.515; 137/566

[56] References Cited

U.S. PATENT DOCUMENTS

| | | | |
|---|---|---|---|
| 3,766,986 | 10/1973 | Kiel | 166/308 |
| 3,977,472 | 8/1976 | Graham et al. | 166/308 X |
| 4,544,032 | 10/1985 | Echols | 252/8.551 X |
| 4,635,727 | 1/1987 | Anderson et al. | 155/308 |
| 4,687,586 | 8/1987 | Argabright et al. | 252/8.551 |
| 4,716,932 | 1/1988 | Adams, Jr. | 166/308 X |

*Primary Examiner*—Bruce M. Kisliuk
*Attorney, Agent, or Firm*—S. A. Littlefield

[57] ABSTRACT

An improved method of mixing a fracturing fluid slurry concentrate comprising a hydrophobic solvent base (e.g., diesel No. 2) and a dispersed hydratable polymer (e.g., hydroxypropyl guar) on a real time basis thus continuously producing a fully hydrated fracturing fluid during the actual fracturing of a subterranean earthen formation. Viscosity rise times of less than 5 minutes are achieved in a continuous operation without the use of large volume storage/hydration tanks, employing primarily conventionally necessary pumps.

15 Claims, 3 Drawing Sheets

METHOD OF HYDRATING OIL BASED FRACTURING CONCENTRATE AND CONTINUOUS FRACTURING PROCESS USING SAME

BACKGROUND OF THE INVENTION

1. Field of the Invention

This invention relates to an improved method of continuously preparing a fracturing fluid or the like during the well treatment on a real time basis. More specifically, but not by way of limitation, the invention relates to a method for rapid hydration of a polymer phase dispersed in an oil based fluid.

2. Description of the Prior Art

High viscosity fracturing fluids are often formulated using dry additives which are mixed with water or other aqueous fluids at the job site. Such commercial mixing procedures are known to involve inherent problems, particularly on remote sites or when large volumes are required. For example, special equipment for mixing the dry additives with water is required and problems such as chemical dusting, uneven mixing, lumping of the gels while mixing and extended preparation and mixing time are involved. The mixing and physical handling of large quantities of dry chemicals require a great deal of manpower, and when continuous mixing is required, the accurate and efficient handling of dry chemicals is extremely difficult. Also, with respect to batch mix applications, the occurrence of job delays can result in the deterioration of premixed gels and potential loss thereof as well as chemical losses due to tank bottoms and problems associated with the cost of pretreatment tank clean up.

In a commonly assigned copending application Ser. No 070,082, a fracturing fluid slurry concentrate useful in a continuous process for supplying a viscous fracturing fluid for hydraulic fracturing of subterranean formations is disclosed. Such a slurry concentrate typically involves a polymer slurry wherein a hydratable polymer is dispersed in a hydrophobic solvent (hereinafter referred to as an oil based fluid) in combination with a suspension agent and a surfactant with or without other optional additives commonly employed in well treatment applications. Because of the inherent dispersion of the hydratable polymer in the oil based fluid (i.e., lack of affinity for each other), such fracturing fluid slurry concentrates tend to eliminate lumping and premature gelation problems and tend to optimize initial dispersion when added to water. However, the rate of hydration of the polymer is still a critical factor particularly in continuous mix applications wherein the necessary hydration and associated viscosity rise must take place over a relatively short time span corresponding to the residence time of the fluids during the continuous mix procedure.

In such applications, hydration is the process by which the hydratable polymer absorbs water. Once the polymer is dispersed, its ability to absorb water will dictate hydration or hydration rate. Several factors will determine how readily the polymer will hydrate or develop viscosity; e.g., the pH of the system (particularly for natural polymers), the amount of mechanical shear applied in the initial mixing phase, the concentration of salts and the polymer concentration. Hydration rate can be influenced through pH control agents which may be blended with the polymer or added to the aqueous medium. Hydration rate can also be controlled by the level of applied shear, with the solution viscosity increasing faster when subjected to high shear. The rate of viscosity development may be influenced (particularly in low shear applications) by the salts present in the solution. The extent of retardation is dependent on the concentration and type of salt. Finally, the viscosity level achieved at a particular point in time is a function of polmer concentration.

Unmodified guar will develop viscosity in all electrolyte systems such as those containing KCl, NaCl, and $CaCl_2$ at high concentrations. Guar gum hydrates most efficiently in the pH range of 7-8, yielding viscosities of 32-36 cps at 511 sec$^{-1}$ in 2% KCl. Guar will not hydrate in organic solvents such as methanol.

Hydroxypropyl guar (HPG) hydrates well in many salt systems at 80° F., and also develops excellent viscosity at temperatures of 40° F. Depending on the mechanical shear applied, 80-90% of the viscosity can be achieved within ten minutes. Optimum hydration of HPG can be realized in the pH range of 4-6. HPG also viscosifies mixtures of methanol and 2% KCL water used typically in a ratio of 50:50.

Carboxymethyl hydroxypropyl guar (CMHPG) hydrates in most electrolyte make-up solutions, however, it is more sensitive to these solutions than guar and HPG. CMHPG hydrates well in both cold and warm water.

In contrast to the above natural polymers, synthetic polymers may also be dispersed and hydrated; however, they may not be as sensitive to pH effects. Consequently hydration and dispersion will rely more on mechanical mixing for these polymers.

Several attempts have been made over the last 30 years to perfect a process and chemicals for continuous preparation of fracturing fluids. A continuous process would allow the fluids to be made "real time" during the fracturing process. This process would have several advantages over the current common method of producing fluids which involve "batch" mixing of water, gelling agent, and other additives into individual "frac" tanks before the treatment is begun. This process is expensive because of the time and equipment required and because of wasted and unused fluids resulting from treatment delays, termination of the treatment before pumping all fluids, and fluid left in the bottom of tanks which cannot be pumped out. The disposal of unused fluids has also become an expensive process because of stricter laws on the disposal of chemical wastes.

SUMMARY OF THE PRESENT INVENTION

The present invention provides an improved method for real time mixing of an oil based fracturing fluid slurry containing a high concentration of dispersed polymer such as to achieve full hydration of the polymer and optimum viscosity rise in four to five minutes or less. The present invention further provides an online system for use in oil field applications that eliminates conventional large volume mixing tanks yet satisfies the fluid flow requirements for large hydraulic fracturing jobs. The improved method according to the present invention accomplishes this using primarily conventionally required pump stages.

Thus the present invention provides a method for rapid hydration of a polymer phase dispersed in an oil based fluid comprising the steps of:

(a) providing an oil based polymer concentrate slurry comprising a hydratable polymer dispersed in a hydrophobic carrier fluid;

(b) injecting an effective amount of the oil based polymer concentrate slurry into a water stream to achieve the desired ultimate viscosity;

(c) pumping the mixture of oil based polymer concentrate slurry and water produced in step (b) through a high shear pump and static mixer at the outlet of the pump into a first essentially plugged flow holding tank at an inlet to the first tank remote to the outlet of the first tank;

(d) pumping the fluid from the outlet of the first essentially plugged flow holding tank through a second high shear pump into a second essentially plugged flow holding tank at an inlet to the second tank remote to the outlet of the second tank; and (e) removing the fully hydrated well treatment fluid from the outlet of the second essentially plugged flow holding tank for use during well treatment.

In one particularly preferred embodiment of the present invention, a particulate phase is added to the resulting hydrated (high viscosity) fluid after less than five minutes of processing. To achieve these short residence times and essentially continuous production of large volumes of high viscosity fracture fluid, particularly during cold weather, additional agitation immediately after high shear injection of the fracturing fluid concentrate may be advantageously employed in the first plugged flow holding tank.

It is an object of the present invention to provide a method of rapid hydration of a high concentration polymer phase dispersed in an oil based fluid when such a slurry is added to water to make a viscous hydraulic fracturing fluid or similar well treatment fluid. It is a further object of the present invention to provide such a method of rapid hydration on an online real time basis such as to continuously prepare viscous fracturing fluid during well treatment. It is still a further object of the present invention to provide a sequence of mixing steps that accomplish the above objects by utilizing conventionally required pumps as the high shear stages and essentially eliminating the need to batch mix the polymer in large volume fracturing tanks and the like. Fulfillment of these objects and the presence and fulfillment of additional objects will become apparent upon complete reading of the specification and claims taken in conjunction with the drawings.

DESCRIPTION OF THE PREFERRED EMBODIMENTS

The rapid hydration of the high molecular weight water soluble polymer phase dispersed in the hydrophobic solvent according to the present invention is to be addressed and analyzed by two approaches. First, the polymer and associated buffer system are to be formulated to hydrate as rapidly as possible such as to achieve the desired ultimate viscosity quickly. The second aspect for rapid hydration of the polymer is the mixing intensity which is to be employed in the overall process. The commercial process according to the present invention achieves fast polymer hydration by utilizing a sequence of mixing steps, each of which individually imparts an effect on the rate of hydration of the polymer, and which collectively requires less horsepower and expense than would be required by using a single high shear device.

According to the present invention a stable, pumpable, high concentration polymer slurry is to be transported to the well site and then continuously admixed with an appropriate water solution such as to produce the desired viscosity rise on a real time basis, as the resulting viscous well treatment fluid is used in the fracturing treatment. Generally, the improved method according to the present invention can be employed in conjunction with any high concentration polymer slurry comprising a hydratable high molecular weight polymer dispersed in a hydrophobic solvent. Preferably the method according to the present invention employs a fracturing fluid concentrate as disclosed in the previously mentioned copending and commonly assigned U.S. patent application Ser. No. 070,082; incorporated herein by reference for such purpose. Typically such a slurry is made up of four ingredients; namely, a hydratable polymer, a hydrophobic solvent base, a suspension agent, and a surfactant. The term high concentration as used herein refers to polymer loading of the fracturing fluid concentrate at weight levels in excess of 30% and typically approaching 60%. The term pumpable refers to the lack of viscosity buildup in the fracturing fluid concentrate over a wide temperature range. The term stable refers to the fracturing fluid concentrate exhibiting minimal polymer separation and no polymer packing for sustained periods of time, typically in excess of a week or more.

Although the behavior of the fracturing fluid concentrate used in the present invention is not viewed as being dependent on any single explanation or theory, and as such any proposed explanation is not to be viewed as unduly limiting, the operability of the stable, pumpable, high concentration polymer slurry can be viewed as involving a hydratable polymer dispersed in a hydrophobic fluid.

As such, the dispersion of hydrophilic, hydratable polymer, which in an aqueous medium would inherently result in a buildup of viscosity, in a hydrophobic environment results in minimum viscosity rise. Consequently the fracturing fluid concentrate according to the present invention remains readily pumpable and builds viscosity only upon admixing with water, aqueous brine or the like. The suspension agent is present to maintain the polymer in a highly dispersed and suspended state within the hydrophobic fluid without significant settling or separation of polymer. This is achieved by virtue of the suspension agent's thixotropic behavior in the hydrophobic fluid. The surfactant is necessary to wet the suspension agent for dispersion in the hydrophobic solvent and for removing the hydrocarbaon from the polymer particles upon admixing the concentrate to the aqueous phase when making the final high viscosity fracturing fluid.

The hydrophobic solvent or solvent base according to the present invention can generally be any fluid that will dissolve and/or suspend a dispersion of the suspension agent, surfactant, and hydratable polymer wherein the rate of hydration of the polymer is retarded. As such, the hydrophobic solvent base can be selected from the group consisting of any of the non-volatile aliphatic and aromatic hydrocarbons and mixtures thereof as generally known in the art. This would include by way of example, but not limited thereto: kerosene; mineral oil; crude oil; crude oil distillates; vegetable oils; silicone oils; halogenated solvents; ester alcohols; primary, secondary and tertiary alcohols of 6–12 carbons; glycol ethers; glycols, such as polypropylene glycol of formula weight greater than 1000; animal oils; and turpentine. Preferably diesel fuel is employed as the hydrophobic solvent base.

The hydratable polymer according to the present invention is essentially any polymer or mixture of polymers as generally known in the art which yield viscosity (i.e., produce a viscosity rise) upon hydration. Thus, the polymers useful in the present invention include, by way of example but not limited thereto, any natural or synthetic polymers including polysaccharides and related polymeric materials such as guar, hydroxypropyl guar (HPG), carboxymethyl hydroxypropyl guar, carboxymethyl hydroxyethyl cellulose, other cellulosics and cellulosic derivatives, polyacrylamides, and similar biopolymers and mixtures thereof. Preferably, the hydratable polymer to be used according to the present invention is guar or quar derivatives.

The suspension agent used according to the present invention can be generally any thixotropic agent for the hydrophobic solvent base. This would include by way of example, but not limited thereto, an organophilic clay, hydroxyalkyl cellulose, hydroxyalkyl-alkyl cellulose, fine-meshed fumed silicas, mixtures thereof and the like.

Preferably, the suspension agent to be employed in the present invention is a highly dispersible organophilic clay, such as the commercially available material sold under the trade name BENTONE SD-1. The suspension agent is to be present in the concentrate at an amount from about 0.5 to about 3.0% by weight. At concentrations below the lower limit of this range, undesirable polymer settling will be observed, while concentations above the range will result in an unpumpable slurry. The most preferred suspension agent concentration is from about 1.0 to about 1.5% by weight of the concentrate.

The surfactant or dispersant useful according to the present invention is generally any such material that is capable of both wetting the suspension agent for dispersion in the hydrophobic solvent and stripping the hydrocarbon from the polymer particles upon introduction into the water to allow hydration of the polymer. As such, this would include by way of example, but not limited thereto, ethoxylated nonylphenol, alkyloxylated alcohols having polymerized propylene oxide and/or ethylene oxide, other copolymers of propylene oxide and ethylene oxide or the like, glycol ethers, various derivatives thereof amd mixtures. The surfactant is preferably an ethyoxylated nonyl phenol employed at a concentration of about 0.2 to about 5.0% by weight of the concentrate. Employing a surfactant at a concentration below the lower limit results in polymer packing.

Figure 1:
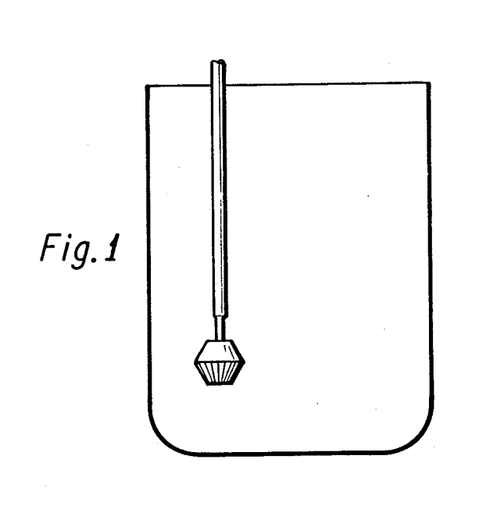
FIG. 1 illustrates a high shear dispersator in a baffled tank employed to measure hydation rates of selected hydratable polymer slurries.
Figure 2:
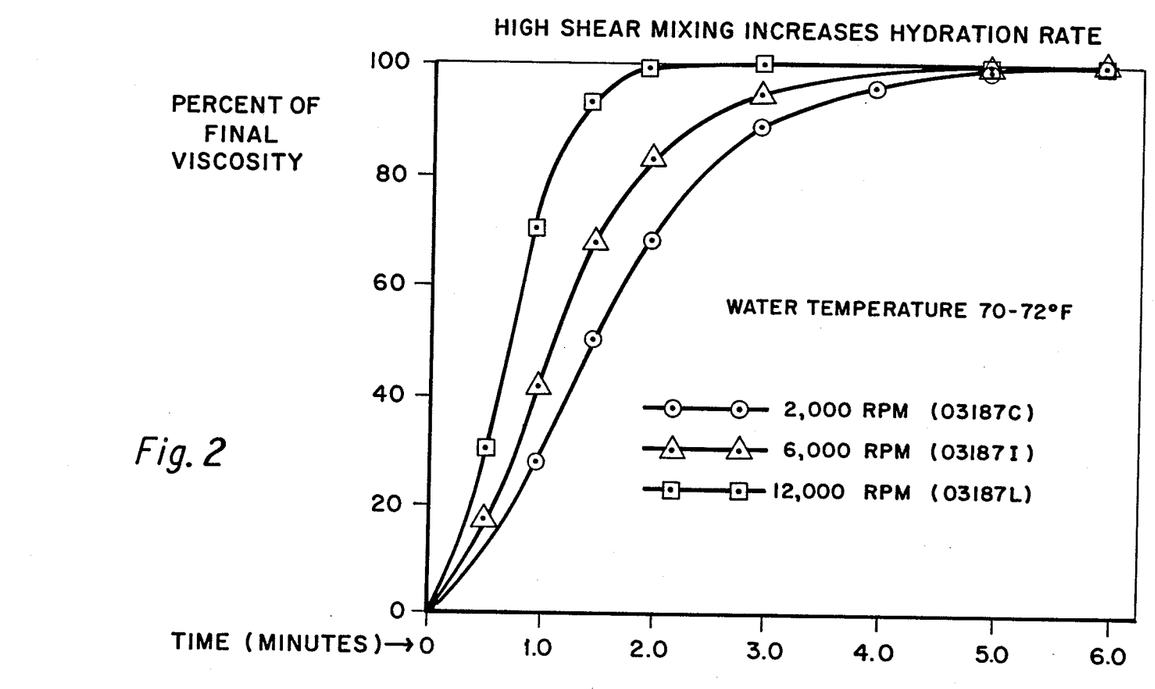
FIG. 2 illustrates plots of measured viscosity rise as a function of time using the high shear mixing of FIG. 1 to promote hydration.

To further illustrate the effect of mixing intensity on the hydration rate of a hydratable polymer dispersed in an oil based carrier fluid according to the present invention, a Premier Dispersator with a one inch duplex head was positioned four inches from the bottom of a baffled tank as shown in FIG. 1. The tank was filled with one gallon of aqueous hydration fluid prepared by dissolving 151.2 grams of potassium chloride in 15.14 liters of deionized water to which was added 3.8 ml of an antifoam agent in combination with 15.2 ml of a mutual solvent. A concentrated hydroxypropyl guar (HPG) slurry was prepared by mixing 7.26 grams of a slurriable HPG sold under the tradename J456 by Dowell Schlumberger with 7.26 grams of No. 2 diesel oil using a propeller type stirrer at 8000 rpm for ten minutes. The Premier Dispersator was set to the desired rpm (2000; 6000 and/or 12,000; see FIG. 2) and a 35 ml aliquot of the slurried HPG concentrate was added to the hydration fluid.

Apparent viscosity in the tank was monitored by circulating a small portion of the fluid from the tank through a Dynatrol Process Viscometer. The percent hydration was determined by dividing the viscosity at a particular time by the final viscosity (after 10 minutes); the results are presented in FIG. 2. The data show that as mixing intensity is increased (higher mixer rpm) the hydration rate is dramatically increased. Rapid hydration occurred at all three mixing rpm with very fast viscosity development occurring when the mixing head was operated at 12,000 rpm. Any of these hydration rates would be acceptable in an actual continuous mix fracturing treatment; however, scaling this process up to effectively mix the amount of fracturing fluid being generated in a high flow rate fracturing treatment (as high as 3000 gal/min) would be extremely difficult and expensive. As a practical matter, rates which achieve about 90% hydration in less than about 5 minutes would be usable and commercially practical.

Figure 3:
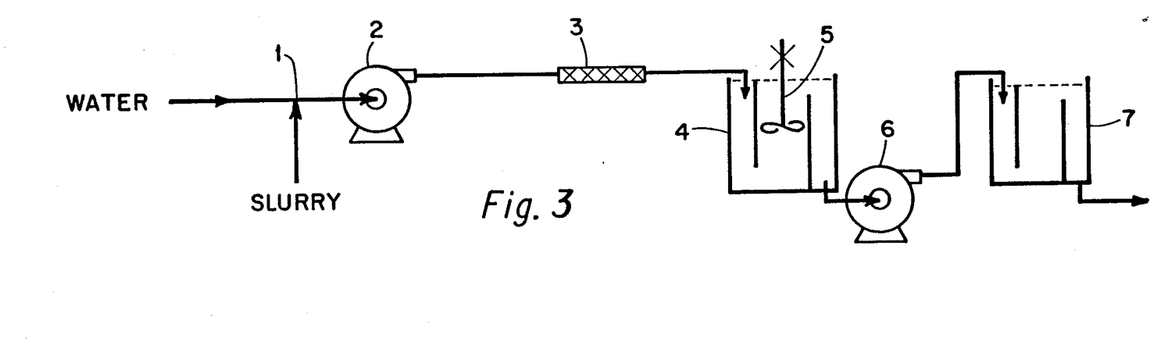
FIG. 3 is a schematic illustration of the improved sequential process of the present invention.

FIG. 3 schematically illustrates one particularly preferred hydration process according to the present invention wherein several conventional elements are used in a novel sequence to create a useful overall hydration rate. In this process, an aqueous hydration fluid and the concentrated HPG slurry similar to that described above were injected together at point 1. The mixture was then pumped through a first centrifugal pump 2 and a static mixer 3 before entering a first holding tank 4. The first holding tank 4 was equipped with a mixer 5 which could be used to increase the hydration rate if needed; however, the mixer 5 was turned off during this procedure. Also, both holding tanks 4 and 7 are internally equiped with baffles to simulate or approach plugged flow conditions within the holding tanks. For purposes of this invention plug flow means any type of flow conditions or associated equipment that tend to simulate the first in first out, FIFO, behavoir thus maximizing the effective residence time per unit volume of tank at any given flow. A second centrifugal pump 6 was used to transfer the fluid from tank 4 to the second holding tank 7.

The concentrate quar slurry employed was an equal weight mixture of quar dispersed in diesel, commercially sold under the tradename XE68010. The aqueous stream was Tulsa, Okla. tap water with 1.0 wt. % KCl and 1 gal/mgal of a polyproylene glychol defoamer.

The temperature of the fluid was 76° F. and the initial pH was 7.4 with a final pH of 7.2. The sequential procedure started with water and slurry injections to the inlet of pump 1 with a flow rate out of pump 1 of 22 gal/minute for one minute. Pump 1 was then shut down for one minute followed by transferring the fluid from tank 4 to tank 7 by use of pump 6 at a flow rate of 45 gal/minute. A Dynatrol viscometer was employed to measure the viscosity of fluid removed from tanks 4 and 7 throughout the procedure and the resulting data are presented in FIG. 4.

Figure 4:
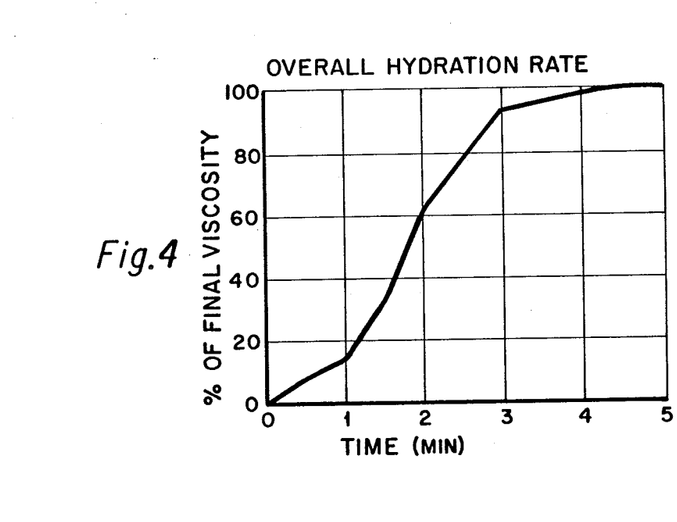
FIG. 4 is a plot of viscosity rise as a function of time for the hydration process of FIG. 3.

As illustrated in FIG. 4, the hydration rate achieved from this process resulted in approximately 90% of final viscosity achieved at 3 minutes of process time and ultimate viscosity in less than 5 minutes, well within desired commercially practical limits. This was achieved using conventionally available centrifugal pumps such as manufactured by TEEL, and static mixers such as sold by Cole-Parmer Instrument company.

Figure 5:
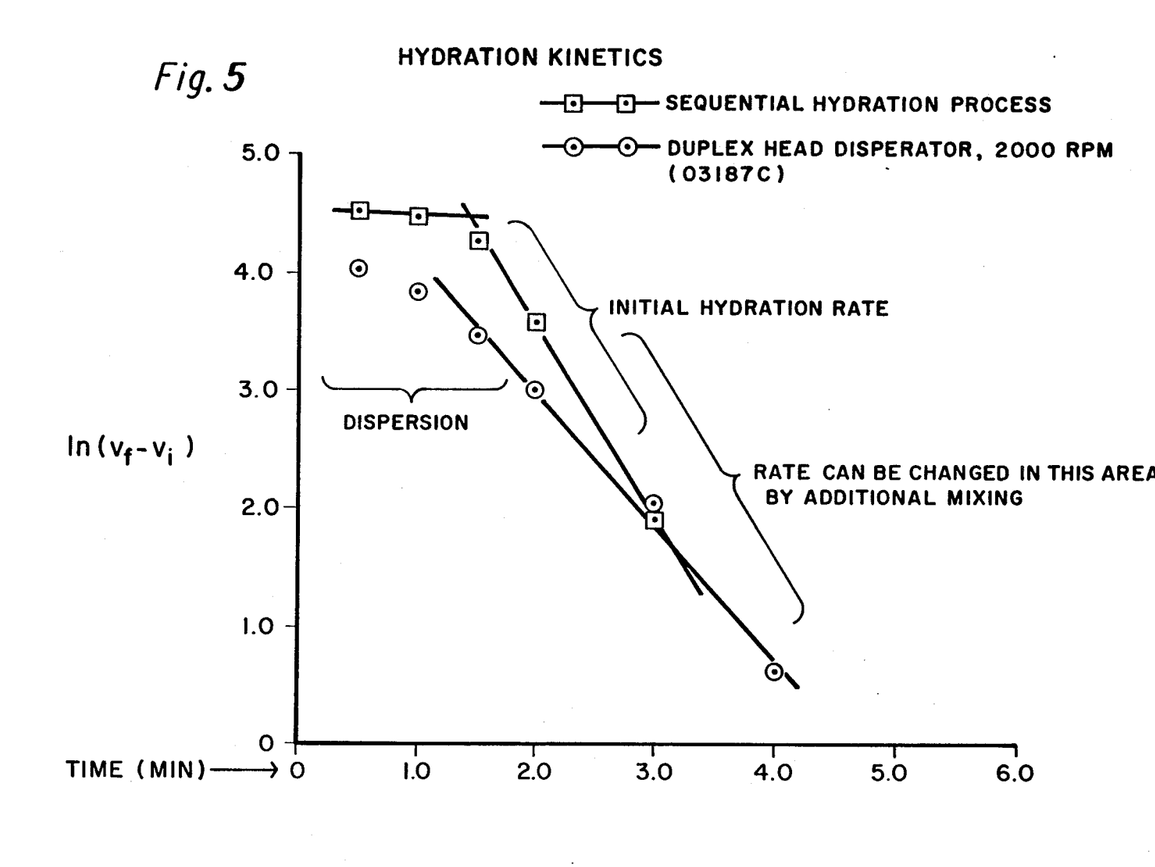
FIG. 5 is a plot of the log of the change in viscosity as a function of time comparing the high shear dispersator of FIG. 1 to the sequential hydration process of FIG. 3.

To further show the nature and advantages of the improved method according to the present invention, FIG. 5 illustrates the hydration kinetics of the above described sequential hydration process of FIG. 3 in comparison to the duplex head dispersator of FIG. 1. As illustrated, in the high intensity mixer, the hydration process of HPG follows first order kinetics; thus, the plot of $1 n(V_f - V_i)$ vs time yields a straight line with the slope equal to the hydration constant (where $V_f$= final, fully hydrated viscosity and $V_i$=the viscosity at a specific time, t, in the process). In contrast, and as illustrated in the sequential mixing procedure, the kinetics of the hydration process at very early times follows a different first order rate constant than the final rate. The slow initial increase in viscosity is related to the method of introduction of slurried polymer into the water and the intensity of mixing which is occurring at that point. By introducing the slurry directly into a flow stream (rather than into the top of an open mixing vessel) the dispersion time can be reduced. Intense mixing of the fluid at this time is also very helpful. Injection of guar or HPG slurry into a flow stream that immediately enters a device such as a centrifugal pump, pipeline mixer, static mixer or similar device minimizes the time to dispersion and begins the hydration process.

Once the polymer has been dispersed into the water stream, hydration begins and if no further high intensity mixing occurs, will continue to hydrate at a fairly constant rate. If additional mixing is introduced at this time (such as with a tank stirrer and/or transferring the fluid to another tank with a centrifugal pump) the hydration rate can be further accelerated.

It is also contemplated that the hydration rate can be further enhanced by intentionally converting the oil based fracturing fluid concentrate slurry to a water based fracturing fluid concentrate slurry prior to injection to the water or hydrating fluid stream. This is accomplished by diluting the oil based fracturing fluid concentrate slurry with a relatively small amount of the overall aqueous phase employed in the final viscous fracturing fluid. However, this increases the sensitivity of the hydration process and associated viscosity rise to such an extent that an online monitoring system should be used to alleviate the risk of catastrophic gellation before the centrifugal pump and static mixer. In the absence of converting the oil based slurry to a water dispersion, response time of the order of minutes is well within conventional manual monitoring and thus does not require exotic control systems.

Having thus described the invention with a certain degree of particularity, it is to be understood that the invention is not limited to the embodiments set forth herein for purposes of exemplification, but is to be limited only by the scope of the attached claims, including a full range of equivalents to which each element thereof is entitled.

We claim:

1. A method for rapid hydration of a polymer phase dispersed in an oil based well treatment fluid comprising the steps of:
    (a) providing an oil based polymer concentrate slurry comprising a hydratable polymer dispersed in a hydrophobic carrier fluid;
    (b) injecting an effective amount of said oil based polymer concentrate slurry into a water stream to achieve the desired ultimate viscosity;
    (c) pumping the mixture of oil based polymer concentrate slurry and water produced in step (b) through a high shear pump and static mixer at the outlet of the pump into a first essentially plugged flow holding tank at an inlet to the frst tank remote from an outlet of the first tank;
    (d) pumping the fluid from the outlet of the first essentially plugged flow holding tank through a second high shear pump into a second essentially plugged flow holding tank at an inlet to the second tank remote from an outlet of the second tank; and
    (e) removing the fully hydrated well treatment fluid from the outlet of the second essentially plugged flow holding tank for use during well treatment.

2. A method of claim 1 wherein sufficient agitation is provided in the first essentially plugged flow holding tank to further enhance the rate of hydration of said oil based polymer concentrate.

3. A method of claim 1 further comprising the step of adding a particulate phase to said hydrated well treatment fluid prior to use during a well treatment.

4. A method of claim 2 further comprising the step of adding a particulate phase to said hydrated well treatment fluid prior to use during a well treatment.

5. A method of claim 1 wherein the hydration time is less then 5 minutes.

6. A method of claim 2 wherein the hydration time is less than 5 minutes.

7. A method of claim 3 wherein the hydration time is less than 5 minutes.

8. A method of claim 4 wherein the hydration time is less than 5 minutes.

9. A method of continuously producing a fracturing fluid during fracturing of an earthen formation comprising the steps of:
    (a) providing a fracturing fluid slurry concentrate comprising a hydratable polymer dispersed in a hydrophobic carrier fluid;
    (b) injecting an effective amount of said fracturing fluid slurry concentrate into a water stream to achieve the desired ultimate viscosity;
    (c) pumping the mixture of fracturing fluid slurry concentrate and water produced in step (b) through a high shear pump and static mixer at the outlet of the pump into a first essentially plugged flow holding tank at an inlet to the first tank remote from an outlet of the first tank;
    (d) pumping the fluid from the outlet of the first essentially plugged flow holding tank through a second high shear pump into a second essentially plugged flow holding tank at an inlet to the second tank remote from an outlet of the second tank; and (e) removing the fully hydrated fracturing fluid produced in step (d) from the outlet of the second essentially plugged flow holding tank;

(f) adding an effective amount of a particulate phase to said fully hydrated fracturing fluid; and (g) injecting said fracturing fluid with particulate phase into an earthen formation.

10. A method of claim 9 wherein sufficient agitation is provided in the first essentially plugged flow holding tank to further enhance the rate of hydration of said fracturing fluid slurry concentrate.

11. A method of claim 9 wherein the hydration time is less than 5 minutes.

12. A method of claim 10 wherein the hydration time is less than 5 minutes.

13. A method of continuously producing a fracturing fluid during fracturing of an earthen formation comprising the steps of:

(a) providing a fracturing fluid slurry concentrate comprising a hydratable polymer dispersed in a hydrophobic carrier fluid;

(b) admixing the fracturing fluid slurry concentrate of step (a) to sufficient water to produce a fracturing fluid slurry concentrate comprising a hydratable polymer dispersed in water;

(c) injecting an effective amount of said water based fracturing fluid slurry concentrate produced in step (b) into a water stream to achieve the desired ultimate viscosity;

(d) pumping the mixture of water based fracturing fluid slurry concentrate and water produced in step (c) through a high shear pump and static mixer at the outlet of the pump into a first essentially plugged flow holding tank at an inlet to the first tank remote from an outlet of the first tank;

(e) pumping the fluid from the outlet of the first essentially plugged flow holding tank through a second high shear pump into a second essentially plugged flow holding tank at an inlet to the second tank remote from an outlet of the second tank; and (f) removing the fully hydrated fracturing fluid produced in step (e) from the outlet of the second essentially plugged flow holding tank;

(g) adding an effective amount of a particulate phase to said fully hydrated fracturing fluid; and (h) injecting said fracturing fluid with particulate phase into an earthen formation.

14. A method of claim 13 wherein sufficient agitation is provided in the first essentially plugged flow holding tank to further enhance the rate of hydration of said oil based polymer concentrate.

15. A method of claim 14 wherein the hydration time is less thn 5 minutes.

* * * * *

UNITED STATES PATENT AND TRADEMARK OFFICE
CERTIFICATE OF CORRECTION

PATENT NO. : 4,828,034

DATED : May 9, 1989

INVENTOR(S) : Vernon G. Constien, Harold D. Brannon

It is certified that error appears in the above-identified patent and that said Letters Patent is hereby corrected as shown below:

Column 3, line 11, delete "plugged" and substitute therefor --plug--.

Column 3, line 16, delete "plugged" and substitute therefor --plug--.

Column 3, line 20, delete "plugged" and substitute therefor --plug--.

Column 3, line 31, delete "plugged" and substitute therefor --plug--.

Column 6, line 64, delete "quar" and substitute therefor --guar--.

Column 6, line 65, delete "quar" and substitute therefor --guar--.

Column 8, line 21, delete "plugged" and substitute therefor --plug--.

Column 8, line 27, delete "plugged" and substitute therefor --plug--.

Column 8, line 30, delete "plugged" and substitute therefor --plug--.

Column 8, line 33, delete "plugged" and substitute therefor --plug--.

Column 8, line 63, delete "plugged" and substitute therefor --plug--.

Column 9, line 1, delete "plugged" and substitute therefor --plug--.

Column 9, line 5, delete "plugged" and substitute therefor --plug--.

Column 9, line 11, delete "plugged" and substitute therefor --plug--.

Column 10, line 9, delete "plugged" and substitute therefor --plug--.

Column 10, line 12, delete "plugged" and substitute therefor --plug--.

Column 10, line 18, delete "plugged" and substitute therefor --plug--.

Column 10, line 24, delete "plugged" and substitute therefor --plug--.

Column 10, line 13, delete "plugged" and insert --plug--.

UNITED STATES PATENT AND TRADEMARK OFFICE
CERTIFICATE OF CORRECTION

PATENT NO. : 4,828,034

DATED : May 9, 1989

INVENTOR(S) : Vernon G. Constien, Harold D. Brannon

It is certified that error appears in the above-identified patent and that said Letters Patent is hereby corrected as shown below:

Column 3, line 15, delete "plugged" and insert --plug--.

Signed and Sealed this

Fifteenth Day of May, 1990

Attest:

HARRY F. MANBECK, JR.

*Attesting Officer*  *Commissioner of Patents and Trademarks*